Figure 1:
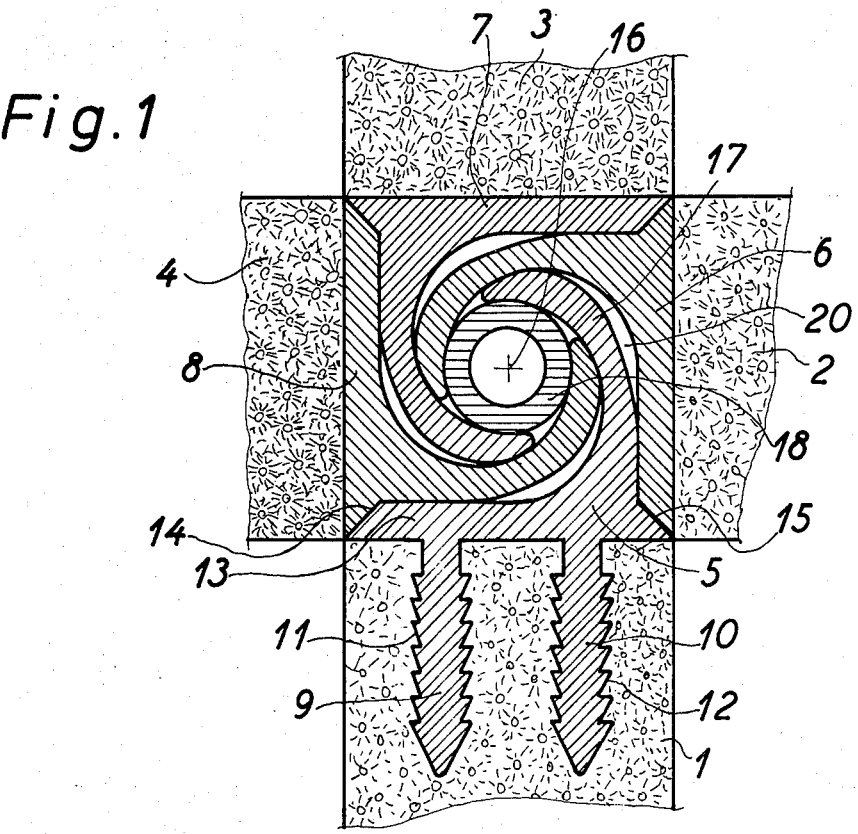

United States Patent [19]

Vinther et al.

[11] 4,236,363

[45] Dec. 2, 1980

[54] ASSEMBLY ELEMENT SETS

[76] Inventors: Knud Vinther; Jette V. Vinther, both of DK-8355 Ny, Solbjerg, Denmark

[21] Appl. No.: 894,914

[22] Filed: Apr. 10, 1978

[30] Foreign Application Priority Data

Apr. 13, 1977 [DK] Denmark ............................ 1625/77

[51] Int. Cl.³ .......................... E04B 2/62; E04B 2/74
[52] U.S. Cl. ...................................... 52/285; 52/281; 52/583
[58] Field of Search ................. 52/583, 586, 584, 285, 52/281

[56] References Cited

U.S. PATENT DOCUMENTS

| | | | |
|---|---|---|---|
| 3,160,249 | 12/1964 | Pavlecka | 52/586 |
| 4,070,808 | 1/1978 | Danescu | 52/584 |

FOREIGN PATENT DOCUMENTS

| | | | |
|---|---|---|---|
| 1372985 | 8/1964 | France | 52/586 |
| 514653 | 2/1955 | Italy | 52/583 |
| 561083 | 4/1957 | Italy | 52/285 |

*Primary Examiner*—James A. Leppink
*Assistant Examiner*—Henry E. Raduazo
*Attorney, Agent, or Firm*—Burgess, Ryan and Wayne

[57] ABSTRACT

This invention concerns a set of assembly elements consisting of assembly rails fitted to engage each other along a nodal line, and which may be intended for the assembly of sheet elements; the individual rail may be attached along the edge of each sheet element by its underside by generally known means, such as screws, glue or tongued and grooved joints; the cross-section of the individual assembly rail consisting of a basic part and a hook-shaped part; at least the basic parts, duly assembled, will bear against each other, preferably along radial surfaces.

11 Claims, 11 Drawing Figures

U.S. Patent Dec. 2, 1980 Sheet 1 of 7 4,236,363

ASSEMBLY ELEMENT SETS

This invention relates to a set of assembly rails for engaging each other along a line, and is particularly suitable for, but not limited to, the assembly of plate elements.

The specification of the generally available Danish patent application, No. 148/76, mentions such sets of assembly components where the outline of the inside of the hook-shaped part is identical with the outline of the outside. Thus, production tolerances are taxed heavily, and it may, therefore, prove difficult to assemble the parts if one wants them to fit without play. Finally, it may prove troublesome to have the individual parts interlocked for this will require inserting the last element from the end, a procedure requiring ample space.

Norwegian Pat. No. 109475 mentions a set of assembly elements which interlock by inserting a lock element. The design known from that patent demands as much from tolerances as the one mentioned above, and it may actually only be used for assembly of two parts. If three parts are required to be assembled, an intermediate piece will have to be assembled in which three assembly rail cross-sections have been cut.

Our invention may be described as relating to a combination of the technique known from the specifications referred to. The set of assembly elements relating to our invention is particular in that at least three assembly rails belong to this set, as well as one or more elongated lock elements, preferably cylindrical or slightly conic, intended for inserting concentrically with the nodal line, the hook-shaped parts having been designed so that they leave room for the lock element or elements in assembled condition. Despite the fact that the designs known both require fine tolerances, the tolerance requirements made on the hook-shaped parts to our invention are much smaller. The outline of the inside of the hook-shaped part does not even have to be identical to the outside. In the assembled condition, there may well be air between the hook-shaped parts in certain sections. This is actually preferable because no tolerance requirements for these sections will apply longer. The surprising technical effect is explained by the fact that the radial surfaces bearing against each other will exhibit a key effect when the lock element is inserted. If there is an adequate amount of air between the hook-shaped parts, the elasticity of the hook-shaped parts may be used to produce the key effect when the rails are drawn up against the nodal line by inserting the lock element or elements.

It should be noted in this connection that an assembly should consist of at least three assembly elements to obtain the key effect referred to. This effect cannot be achieved by the designs to the technique known.

One particular design for the set of assembly elements is particular in that the lock element or elements is/are constituted by two plug-like parts designed for inserting at each end of the rails assembled. Thus, you may interlock the rails in a simple manner since it has, in respect of many applications, proved entirely sufficient to lock at the ends of the rails.

A further development of this design shows the feature that each of the plug-like parts has been designed using a cover plate as the assembled cross-section of the rails. Thus, you may cover the ends of the assemblies in a simple manner. At the same time you have the position of all the rails adjusted longitudinally so that the ends will be at the same level.

If the set of assembly elements consists of four assembly rails which will, when assembled, form a central, cylindrical hole, concentrically with the nodal line, and where the contact faces of the basis parts run diagonally, it may, by the invention, be particular in that the individual sections of each of the hook-shaped parts bordering on the cylindrical hole will cover an arc of 90° where each curve lies symmetrically around a diagonal, and that each hook-shaped part at the end of the circular arc is converted into generally axial surfaces. A design of this type will provide considerable longitudinal rigidity, and this is particularly advantageous when using lock element that covers only part of the assemblies from the ends, and at the same time this design will entail that the hook-shaped part of one of the neighbouring elements lying along the inside of the hook-shaped part of the first element will be retained by the axial surfaces in the entire longitudinal direction of the rails so as to achieve an approximate lock effect in the full length even though lock plugs only are being used at each end of the assembly.

Further, this design renders it possible to assemble two neighbouring elements by inserting transversely. The other two neighbouring elements may then be assembled in the same manner, and finally the two pairs thus established may be assembled in the same manner by inserting crosswise of the longitudinal direction, i.e. crosswise of the nodal line. The direction in which the last interlocking will be made will depend on how you match the first two neighbouring elements, such as will be explained in relation to the drawing.

Another further development is particular in that the surfaces form an angle $\alpha$ with the axial planes going through the end points of the arc sections (axial edges). Using this design, you do not have to use any lock element at all since the last element will be pushed into place from the end of the assembly.

Another further development is particular in that the rails are made of metal, preferably extruded, whereas the plug-like parts are made of elastic plastic. Thus, the rails will obtain a suitable rigidity for instance to be used for shelves, and at the same time you may, by using plastic, easily obtain suitable elasticity which will render the actual assembly rigid and devoid of play.

A third design is particular in that the lock element or elements has/have been designed as one with one of the rails. Thus, you will not have to work with a loose lock element. In this connection, it will be necessary when assembling to insert the last rail, possibly the one with the lock element.

The invention is explained further with reference to the drawing where

Figure 2:
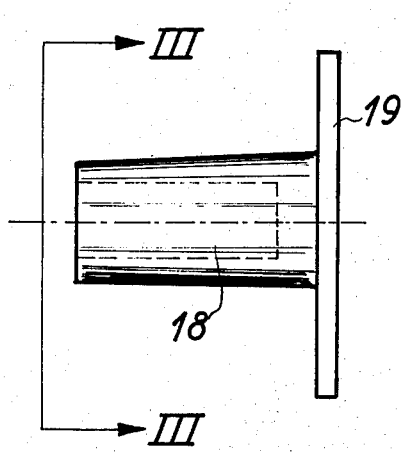
Figure 3:
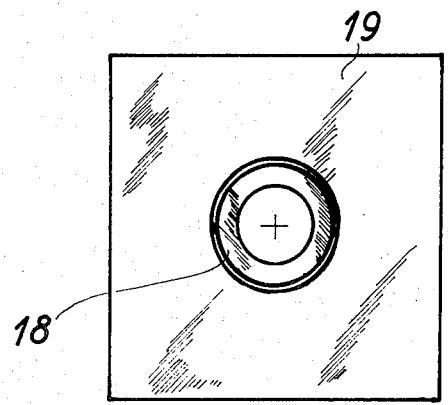
Figure 4:
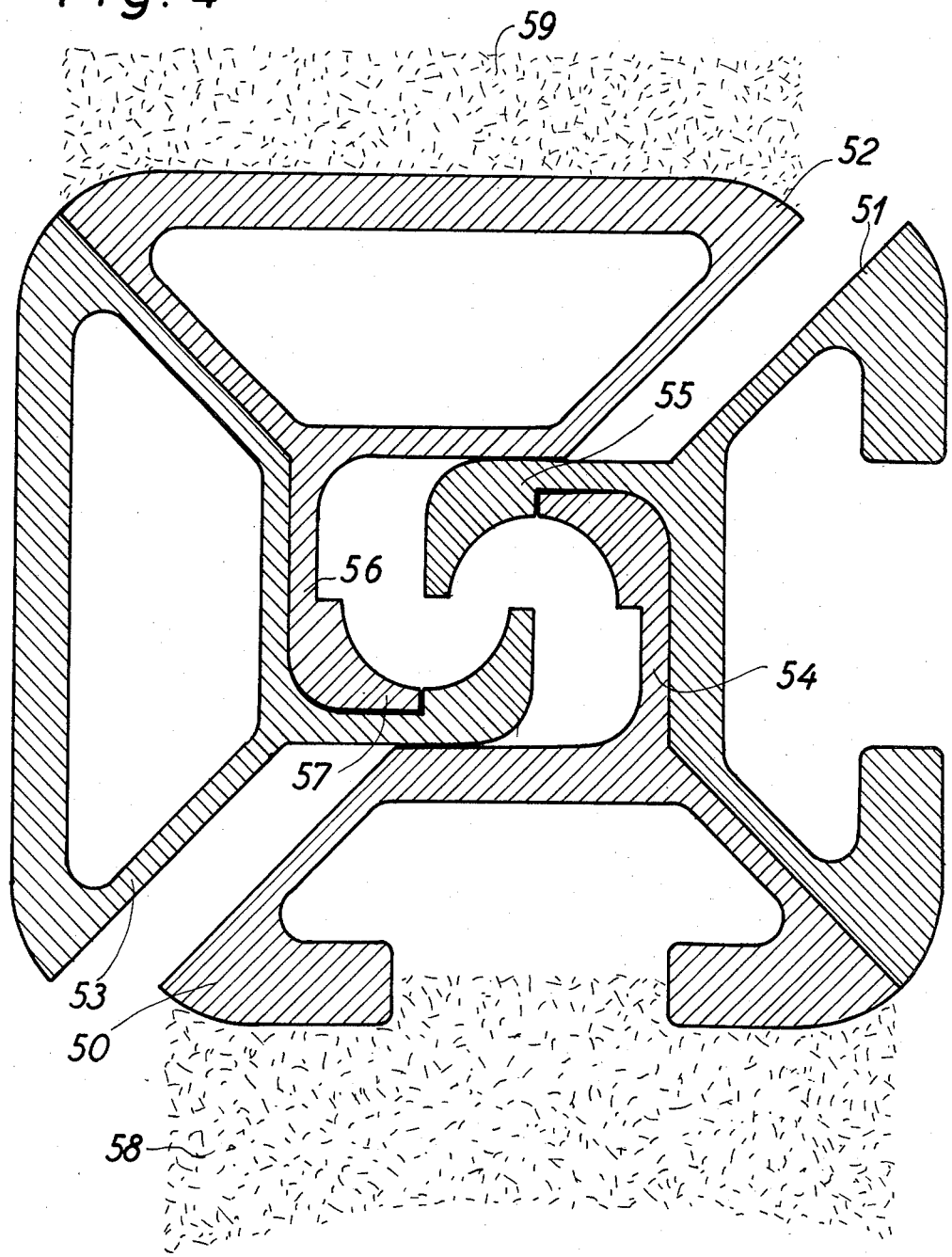
Figure 5:
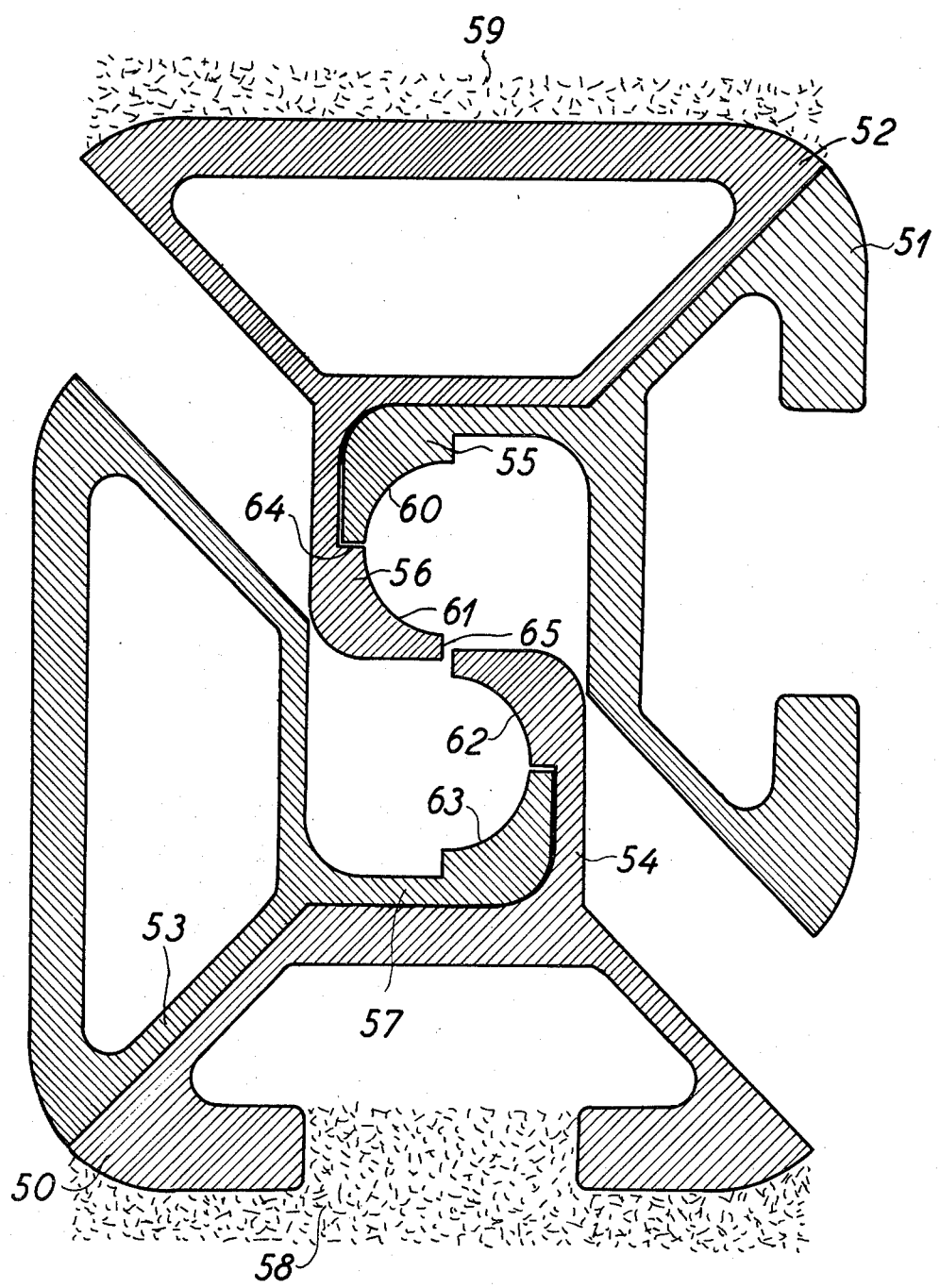
Figure 6:
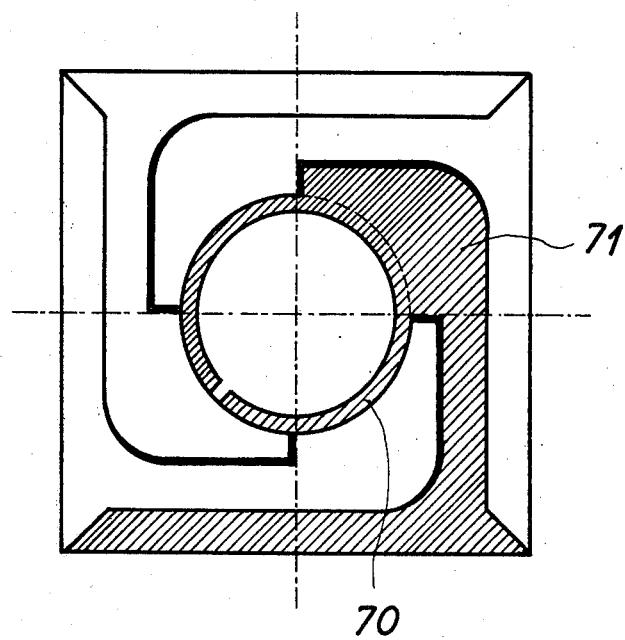
Figure 7:
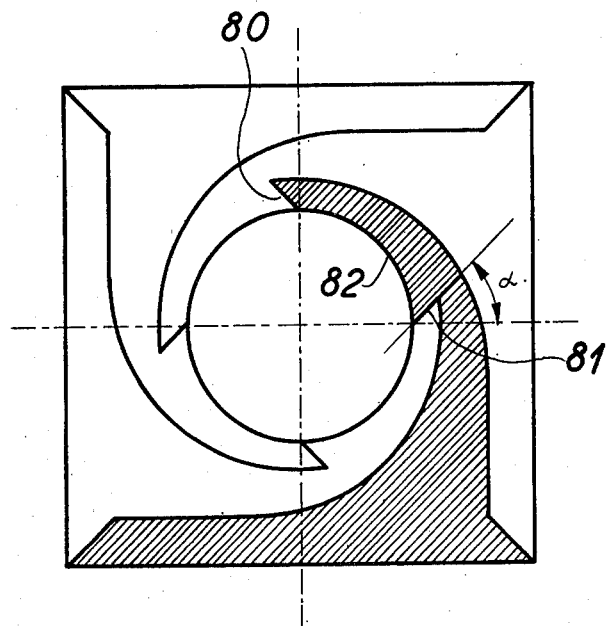
Figure 8:
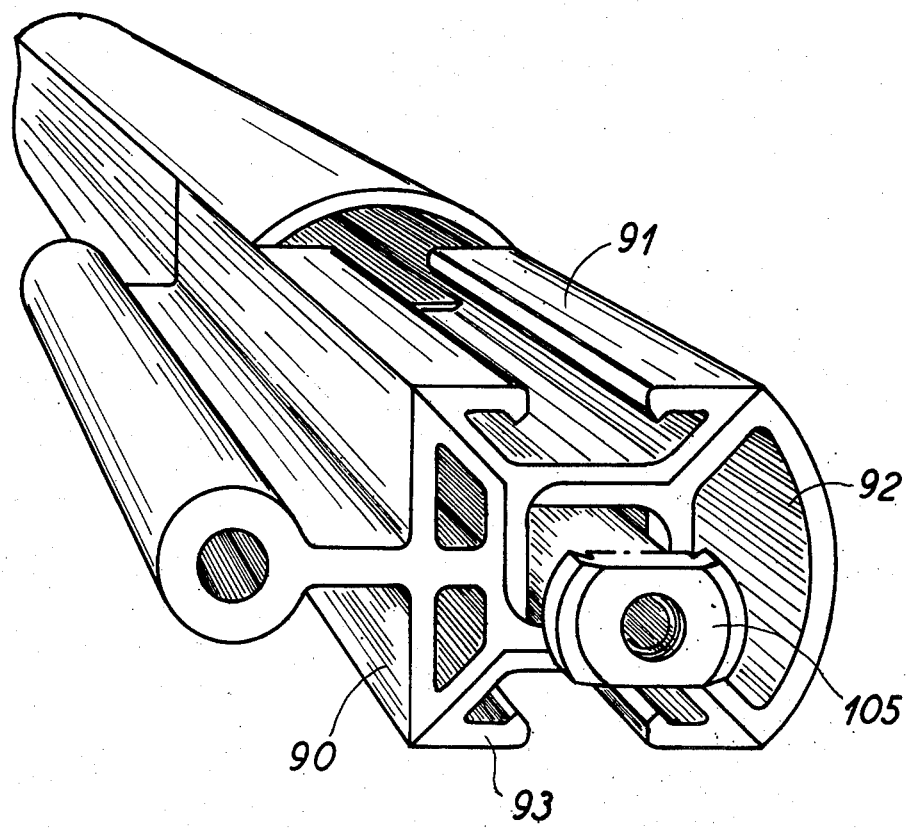
Figure 9:
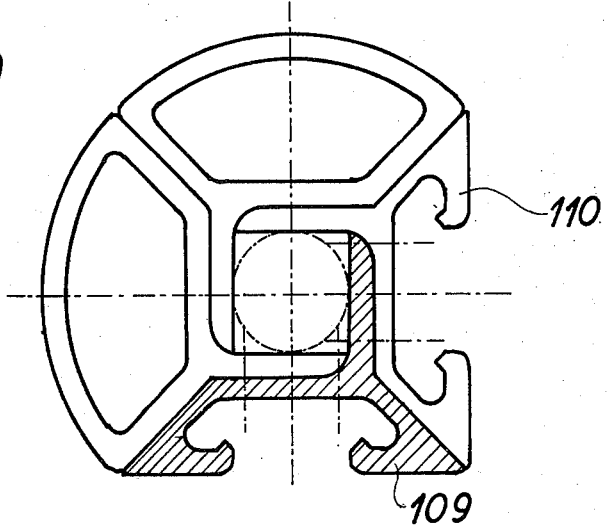
Figure 10:
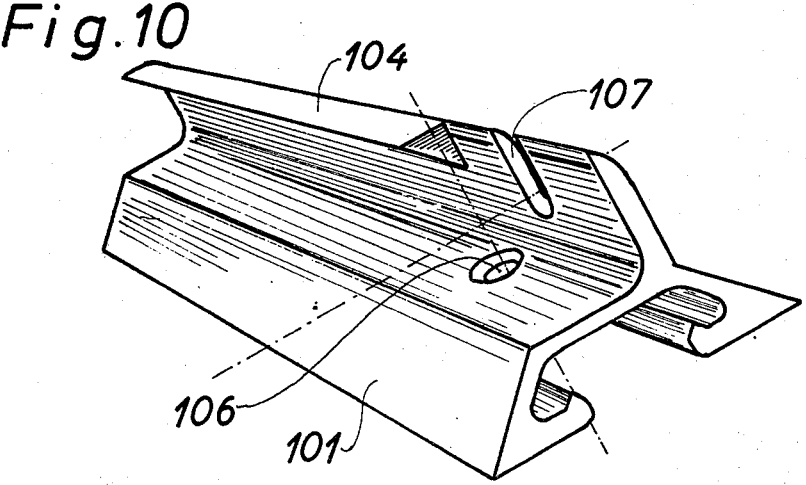
Figure 11:
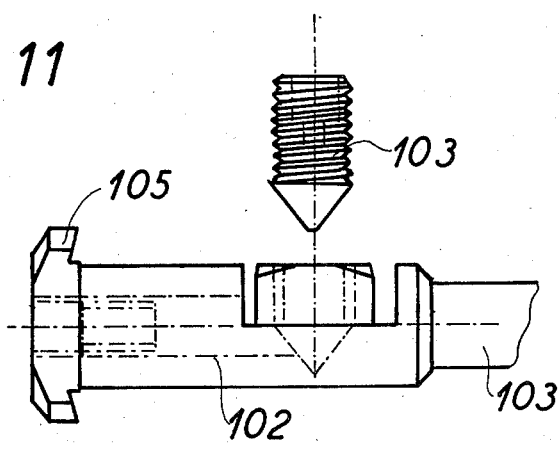

FIG. 1 shows a design for a set of assembly elements to the invention duly assembled, shown as a cross-section, FIG. 2 a design for a lock element to the invention, viewed from the side, FIG. 3 the same seen from the end of the arrows III—III of FIG. 2, FIG. 4 a cross-section of another design for a set of assembly elements to the invention in partly disassembled condition, i.e. without the lock element having been inserted, FIG. 5 the same, but partly separated in another way, FIG. 6 another design for a set of assembly elements to the invention, viewed from the end, but where one of the rails, designed as one with the lock element, has been shown in sectional view, FIG. 7 a third design for a set of assembly elements to the invention, seen from the end, but showing a sectional view of one of the rails, FIG. 8 illustrates in perspective a set of assembly elements to the invention according to which the rails have been designed with different sections, FIG. 9 a similar set seen from the end, FIG. 10 a rail belonging to the sets to FIGS. 8 and 9 viewed in perspective, and FIG. 11 a lock element belonging to the sets of FIGS. 8 and 9, viewed from the side.

FIG. 1 shows parts of four plates 1, 2, 3, and 4 which may, for instance, be made of wood, metal, or plastic. At the edge of each plate, four identical rails 5, 6, 7, and 8 have been attached; these would preferably be made from material which may be extruded. The way in which the rails 5, 6, 7, and 8 have been attached to the plates 1, 2, 3, and 4 constitutes no part of the invention, and consequently no method of attaching the rails 6, 7, and 8 has been illustrated. In respect of rail 5, a possible and actually known attachment device has been shown, to the effect that flanges 9 and 10 have been extruded with the rail; the flanges are equipped with barbs 11 and 12 designed for knocking into corresponding slots worked out in plate 1. Tape may, of course, be used in connection with the attachment. The design of rails 5, 6, 7, and 8 is now explained with reference to rail 5. Rail 5 consists of a base part 13, designed with lateral faces 14 and 15 which are level and which are contact faces against corresponding faces of neighbouring rails 8 and 6. Lateral faces 14 and 15 are actually directed radially in proportion to the nodal line 16 (centre of the figure) around which the assembly has been performed. Base part 13 continues upwards in a hook-shaped part 17. After rails 5, 6, 7, and 8 have been inserted into each other and thus loosely interlocked, a cylindrical or slightly conic lock element 18 has been inserted which may be through-going in the length of the rails. However, it has been found that for most practical applications, such as building up shelves, it will be adequate to insert lock elements as shown in FIGS. 2 and 3 at the ends of the rails assembled.

The lock element of FIGS. 2 and 3 consists of a plug part 18 which is hollow, and a square cover plate 19 which will cover the total rail cross-section as shown in FIG. 1. Plug part 18 may be cylindrical or conic as shown, and when pressed in it will produce a distortion of the hook-shaped parts 17 as these have been designed in a manner to provide air between them in certain sections as shown at 20. Thus, the individual rails will be pulled towards the middle, thus producing at the lateral faces 14 and 15 and the corresponding other lateral faces a key effect entailing a fixed contact between rails even though the hook-shaped parts have been designed at considerable tolerances. Using designs to the known technique will not render this possible since the outlines have to fit each other exactly, and the lock element cannot be pressed in if it shows excessive measurements.

FIG. 4 shows a design for assembly rails, the basic parts of which, 50, 51, 52, and 53, are hollow whereas the hook-shaped parts 54, 55, 56, and 57 have a special shape allowing for inserting sideways when assembling a longitudinal joint. That this is a question of a longitudinal joint is illustrated by the fact that basic parts 50 and 52 have been attached to plate material 58 and 59.

FIG. 5 shows the same longitudinal joint with the same reference figures during assembly or disassembly in the longitudinal direction. These two methods of assembly cannot be used in connection with the designs to the known technique.

As would appear from the designs of the hook-shaped parts shown, these parts may be designed in many different ways. Thus, the clearances between the hook-shaped parts mentioned may well be so small that they cannot be perceived upon mere reflection such as would apply to FIGS. 4 and 5.

The design of the hook-shaped parts to FIGS. 4 and 5 shows specific features. Thus, the hook-shaped parts together create in closed position a cylinder surface the individual sections of which 60, 61, 62, and 63 cover an arc of 90° so that each arc lies symmetrically around a diagonal. At the end of each circular arc section, each of the hook-shaped parts shows axial faces. This applies for instance to the hook-shaped part 56 with the circular arc section 61 and with the axial faces 64 and 65. These axial faces increase the longitudinal rigidity in a long assembly and will to a higher extent make it possible to insert lock elements at the ends of an assembly only.

FIG. 6 shows a design of a similar nature where the lock element is a slotted tube 70 designed as one with a hook-shaped part 71. If all four rails and lock element 70 are equally long, this design will require much space for inserting the last rail which need not be the one with the lock element.

Similar aspects apply in the case of the design to FIG. 7 where faces 80 and 81 at the ends of an arc section 82 form an angle α with axial faces going through the ends of the arc sections. In the case of this design, you can do without the lock element.

FIG. 8 shows a design consisting of four section rails 90, 91, 92, and 93 with different section cross-sections. In the outer ends of the rails, the hook-shaped parts have been removed, such as shown in the case of rail 101 in FIG. 10, to allow for the insertion of a lock element 102 with a lock screw 103 of an actually known type as shown in FIG. 11. The lock element has been designed inside with a cylindrical part 103 interacting as explained to the invention with the hook-shaped parts 101 in FIG. 10. It is the outer end of lock element 102 that works in an actually known way by being designed with a T-shaped part 105 with rounded-off ends designed for insertion into a section rail like rail 91 in FIG. 8 or rails 109 and 110 in FIG. 9. In order that lock element 102 may be attached to the assembly as shown in FIG. 8, rail 101 in FIG. 10 must be designed with a hole 106 and a slot 107.

Obviously, this invention may be varied within a wide scope, and one does not necessarily have to work with four rails. There may well be more rails than four. Further, the rails do not have to run along the entire edge of a plate element. There may well be a rail part at each end of the edge of a plate element.

We claim:

1. A set of at least three elongated assembly rails for engaging each other along an axial line, at least one of said rails being adapted to have a plate affixed thereto,
   each of said rails having at least one axially extending end portion comprising a base part and a resilient hook-shaped part,
   the base part of each adjacent rail having a pair of radially directed surfaces adapted to mate with the corresponding radially directed surfaces of the base parts of the adjacent rails, and the other hook-shaped parts thereof all being substantially equal in size and forming a cylindrical hole around said axial line and a locking member disposed in said hole for urging the portions of said hook-shaped parts adjacent said hole against each other, said locking member exerting a camming action which thereby forces said radially directed surfaces together, whereby said rails are stabilized in a locking relationship.

2. The set according to claim 1, comprising four of said rails, the hook-shaped part of each said rail subtending an angle on the order of 90° as measured from said axial line.

3. The set according to claim 1 wherein said locking member is circular in cross-section.

4. The set according to claim 3, wherein said locking member is cylindrical.

5. The set according to claim 3, wherein said locking member is slightly conical.

6. The set according to claim 1, wherein said locking member comprises a single elongated plug extending the length of said hole.

7. The set according to claim 1, wherein said locking member comprises a pair of plugs, each said plug being relatively short with respect to said cylindrical hole and being inserted at one end thereof.

8. The set according to claim 7, wherein each plug further comprises a square end plate of a size sufficient to cover the total cross-sectional area of said rails.

9. The set according to claim 1, wherein the contact faces of said base parts bearing against each other run diagonally with respect to said rails and extend radially from said axial line, each hook-shaped part comprising a base portion having an essentially linear inner face, an axially extending shoulder, an outer portion having an arcuate inner face, and an axially extending outer face, whereby said outer face of each hook-shaped part mates with said shoulder of each adjacent hook-shaped part.

10. The set according to claim 1 wherein said locking member is adapted to be expandible while disposed in said hole.

11. The set according to claim 1, wherein said locking member is integrally formed with one of said rails.

* * * * *

UNITED STATES PATENT AND TRADEMARK OFFICE
CERTIFICATE OF CORRECTION

PATENT NO. : 4,236,363

DATED : December 2, 1980

INVENTOR(S) : Knud Vinther, et al

It is certified that error appears in the above—identified patent and that said Letters Patent is hereby corrected as shown below:

In the title page, in the inventors' address: Delete the comma between "Ny" and "Solbjerg".

In the Abstract, line 8: "basic" should be --base--.

Column 2, line 6: "basis" should be --base--.

line 60: "of" should be --to--.

Signed and Sealed this

Sixteenth Day of June 1981

[SEAL]

Attest:

Attesting Officer

RENE D. TEGTMEYER

Acting Commissioner of Patents and Trademarks